(12) United States Patent
Kulkarni et al.

(10) Patent No.: US 11,126,600 B2
(45) Date of Patent: Sep. 21, 2021

(54) SYSTEM AND METHOD TO ACCELERATE COMPACTION

(71) Applicant: RENIAC, INC., Mountain View, CA (US)

(72) Inventors: Chidamber Kulkarni, Hyderabad (IN); Prasanna Sundararajan, Palo Alto, CA (US)

(73) Assignee: RENIAC, INC., Santa Clara, CA (US)

( * ) Notice: Subject to any disclaimer, the term of this patent is extended or adjusted under 35 U.S.C. 154(b) by 266 days.

(21) Appl. No.: 15/961,421

(22) Filed: Apr. 24, 2018

(65) Prior Publication Data

US 2018/0307711 A1    Oct. 25, 2018

Related U.S. Application Data

(60) Provisional application No. 62/526,252, filed on Jun. 28, 2017.

(30) Foreign Application Priority Data

Apr. 24, 2017  (IN) .............................. 201741014424

(51) Int. Cl.
*G06F 16/30* (2019.01)
*G06F 16/215* (2019.01)
*G06F 16/23* (2019.01)

(52) U.S. Cl.
CPC ........ *G06F 16/215* (2019.01); *G06F 16/2365* (2019.01)

(58) Field of Classification Search
CPC ............... G06F 16/30; G06F 16/30339; G06F 16/30315; G06F 16/30353;

(Continued)

(56) References Cited

U.S. PATENT DOCUMENTS 9,448,927 B1 *  9/2016  Agarwala ........... G06F 12/0811
9,747,322 B2 *  8/2017  Drobychev ............. G06F 16/27

(Continued)

OTHER PUBLICATIONS

International Search Report and Written Opinion dated Jul. 5, 2018 issued in related PCT Patent App. No. PCT/US2018/029074 (16 pages).

(Continued)

*Primary Examiner* — Kuen S Lu

(74) *Attorney, Agent, or Firm* — Artegis Law Group, LLP

(57) ABSTRACT

A system and method for accelerating compaction includes a compaction accelerator. The accelerator includes a compactor separate from a processor performing read and write operations for a database or a data store. The compactor is configured to receive a table to be compacted and entries written in the table, each of the entries being associated with a timestamp indicating when they were respectively written; identify, using a plurality of sort engines operating in parallel, the entries that were written last based on the timestamps; mark, using a plurality of marker engines operating in parallel, older copies of the entries for deletion; create, using the plurality of marker engines, tombstones for the older copies; create a compacted table, including the entries that were last written; delete the tombstones and the entries associated with the tombstones; and generate a freemap based on storage locations of the entries associated with the tombstones.

22 Claims, 5 Drawing Sheets

(58) Field of Classification Search
CPC ......... G06F 17/30315; G06F 16/30303; G06F 16/2365; G06F 16/215; Y10S 707/99942
USPC .......................................................... 707/692
See application file for complete search history.

(56) References Cited

U.S. PATENT DOCUMENTS

| | | | |
|---|---|---|---|
| 2007/0277036 A1* | 11/2007 | Chamberlain | G06F 9/4881 713/171 |
| 2013/0218840 A1* | 8/2013 | Smith | G06F 11/1662 707/639 |
| 2014/0298039 A1* | 10/2014 | Pandya | G06F 3/0679 713/190 |
| 2015/0039852 A1* | 2/2015 | Sen | G06F 16/24544 712/4 |
| 2016/0217042 A1* | 7/2016 | Wang | G06F 11/1461 |
| 2018/0011897 A1* | 1/2018 | Kim | G06F 16/24552 |
| 2018/0225315 A1* | 8/2018 | Boles | G06F 16/2455 |

OTHER PUBLICATIONS

Extended European Search Report for application No. 18791106.0 dated Aug. 26, 2020.
Chang et al., "Bigtable: A Distributed Storage System for Structured Data", ACM Transactions on Computer Systems (TOGS), XP058290933, ISSN: 0734-2071, DOI: 10.1145/1365815.1365816, vol. 26, No. 2, Jun. 1, 2008, pp. 4:1-4:26.
Dittrich et al., "Movies: indexing moving objects by shooting index images", Geoinformatica ; An International Journal on Advances of Computer Science for Geographic Information Systems, Kluwer Academic Publishers, BO, XP019955661, ISSN: 1573-7624, DOI: 10.1007/S10707-011-0122-Y, vol. 15, No. 4, Feb. 3, 2011, pp. 727-767.

* cited by examiner

SYSTEM AND METHOD TO ACCELERATE COMPACTION

RELATED APPLICATIONS

This application claims priority to U.S. Provisional Patent Application No. 62/526,252 filed Jun. 28, 2017 and entitled and "System and Method to Accelerate Compaction" and Indian Provisional Patent Application No. 201741014424 filed Apr. 24, 2017 and entitled "System And Method To Accelerate Compaction," each of which is incorporated by reference in its entirety.

TECHNICAL FIELD

The present disclosure relates generally to computing systems and the use of compaction with log-structured merge-tree data structures.

BACKGROUND

Log-structured merge-tree (LSM) data structures are used in many databases and data stores (e.g., NoSQL Databases, Hadoop distributed file system (HDFS), etc.). LSM data structures are popular because they allow databases and data stores to leverage hierarchical memory and storage subsystems that are prevalent (e.g., DRAM memory, flash memories, etc.) in CPU-based server architectures. Specifically, use of LSM data structure enables the handling of insert/write operations significantly faster because writes and/or inserts append to a LSM data structure residing in a faster memory (e.g., DRAM) and a process to compact and merge all the writes corresponding to a specific location or key to persistent data store happens separately. This enables faster response times for write operations at the cost of performing a compaction process at a later time that determines the latest copy of a write, deletes all other older copies, and merges the write into another data structure on the disk, where a persistent copy of the data is stored. Accordingly, it would be advantageous to develop improved methods and systems for performing compaction.

SUMMARY

According to some embodiments a compaction accelerator includes a compactor separate from a processor performing read and write operations for a database or a data store. The compactor is configured to receive a table to be compacted; receive entries written in the table by the processor, each of the entries being associated with a timestamp indicating when they were respectively written; identify, using a plurality of sort engines operating in parallel, the entries that were written last based on the timestamps; mark, using a plurality of marker engines operating in parallel, older copies of the entries for deletion; create, using the plurality of marker engines, tombstones for the older copies; create a compacted table, including the entries that were last written, to be written to persistent storage; delete the tombstones and the entries associated with the tombstones; and generate a freemap based on storage locations of the entries associated with the tombstones.

According to some embodiments a method of database compaction performed by a compactor separate from a processor performing read and write operations for a database or a data store. The method includes receiving a table to be compacted; receiving entries written in the table by the processor, each of the entries being associated with a timestamp indicating when they were respectively written; identifying, using a plurality of sort engines operating in parallel, the entries that were written last based on the timestamps; marking, using a plurality of marker engines operating in parallel, older copies of the entries for deletion; creating, using the plurality of marker engines, tombstones for the older copies; creating a compacted table, including the entries that were last written, to be written to persistent storage; deleting the tombstones and the entries associated with the tombstones; and generating a freemap based on storage locations of the entries associated with the tombstones.

According to some embodiments, system includes a plurality of compaction accelerators. Each of the compaction accelerators includes a respective compactor separate from a processor performing read and write operations for a database or a data store. Each respective comparator is configured to receive a table to be compacted; receive entries written in the table by the processor, each of the entries being associated with a timestamp indicating when they were respectively written; identify, using a plurality of sort engines operating in parallel, the entries that were written last based on the timestamps; mark, using a plurality of marker engines operating in parallel, older copies of the entries for deletion; create, using the plurality of marker engines, tombstones for the older copies; create a compacted table, including the entries that were last written, to be written to persistent storage; delete the tombstones and the entries associated with the tombstones; and generate a freemap based on storage locations of the entries associated with the tombstones.

Figure 1:
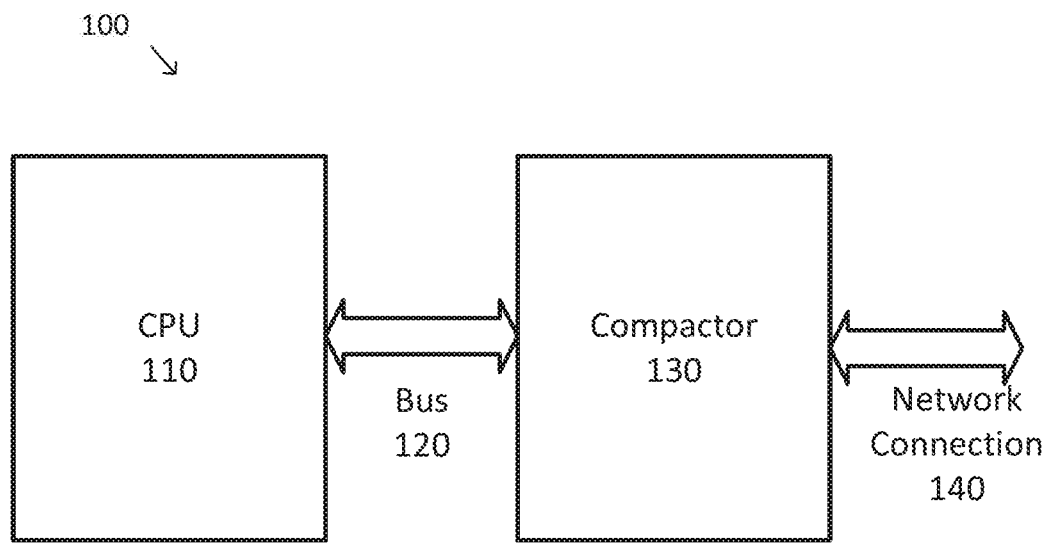
FIGS. 1 and 2 are simplified diagrams of possible compactor architectures according to some embodiments.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Many database administrators, as well as applications that leverage data stores based on LSM data structures, have to take into account the fact that whenever a compaction process is running there will be impact of the read latencies to the databases or data stores because CPU utilization is configured to either be shared between compaction and read operations or configured towards finishing compaction quickly before processing read quests. In either approach, read latencies are negatively impacted.

This may be illustrated in the context of a Cassandra database. Write operations using a Cassandra database include both logging and compaction. More specifically, when a write occurs, Cassandra stores the data in a structure in memory, the memtable, and also appends writes to the commit log on disk. In some examples, the commit log receives every write made to a Cassandra node, so that these writes are durable and survive permanently even after power failure. In some examples the memtable is a write-back cache of data partitions that Cassandra looks up by key. In some example, the memtable stores write data until a configurable limit is reached, and then is flushed.

In some examples, flushing includes placing the write data from the memtable into a queue to be flushed to disk. When the data to be flushed exceeds the queue size, Cassandra block writes the data until the next flush succeeds. To flush the data, Cassandra sorts the data in the memtable by token and then sequentially writes the data to disk. Data in the commit log is purged after its corresponding data in the memtable is flushed to a stored string table (SSTable).

In some examples, memtables and SSTables are maintained for each database table. SSTables are immutable and are not written to again after the memtable is flushed to a SSTable. Thus, in some examples, a partition is typically stored across multiple SSTable files. For each SSTable, Cassandra creates these structures: a partition index, a list of partition keys and the start position of rows in the data file, and a partition summary. In some examples, the partition index may be implemented using a Bloom filter.

In many implementations, periodic compaction is essential to a healthy Cassandra database because Cassandra does not perform inserts and/or updates in place. Instead of overwriting the rows, as inserts and/or updates occur, Cassandra writes a new time stamped version of the inserted or updated data in another SSTable. Cassandra manages the accumulation of SSTables on disk using compaction. Further, Cassandra does not delete in place because the SSTable is immutable. Instead, Cassandra marks data to be deleted using a tombstone.

Compaction merges the data in each SSTable by partition key, selecting the latest data for storage based on its timestamp. After evicting tombstones and removing deleted data, columns, and rows, the compaction process consolidates SSTables into a single file. The old SSTable files are deleted as soon as any pending reads finish using the files. Storage space occupied by old SSTables becomes available for reuse.

Thus, the CPU on the system implementing Cassandra is burdened by the compaction process and read latencies become negatively impacted.

There are two approaches to address this problem. A first approach is to have a transparent cache that is synchronized with the backend database or data store while ensuring that the application characteristics allow caching to be beneficial. This mitigates the effect of the compaction process on read latencies. A second approach is to offload or accelerate the compaction process on a compactor such as a field programmable gate array (FPGA), an application specific integrated circuit (ASIC), a graphics processing unit (GPU), and/or the like. The enables the primary central processing unit (CPU) to be utilized to provide better read latencies.

FIG. 1 is a simplified diagram of compactor architecture 100 according to some embodiments. As shown in FIG. 1, architecture 100 includes a CPU 110 coupled via a bus 120 to a compactor 130. In some examples, CPU 110 is representative only, and may alternatively be replaced with one or more central processing units, multi-core processors, microprocessors, microcontrollers, digital signal processors, FPGAs, ASICs, GPUs, and/or the like. In some examples, bus 120 may be compatible with a bus standard used to couple processors and peripherals devices, such as the Peripheral Component Interconnect Express (PCIe) standard and/or the like. In some examples, compactor 130 may be arranged as a plug-in card, such as a PCIe form factor card and/or the like. In some examples, compactor 130 may include one or more FPGAs, GPUs, ASICs, and/or other hardware-based cores as is described in further detail below. In architecture 100, the data required by compactor 130 is moved from memory of CPU 110 to memory of compactor 130 over bus 120. In some examples, cache coherency may additionally be supported over bus 120, but latency across bus 120 may be high. In some examples, the cache coherency may use the IBM Coherent Accelerator Processor Interface (CAPI). As further shown in FIG. 1, compactor 130 is coupled to one or more network connections 140. In some examples, the one or more network connections 140 may be one or more Ethernet connections (e.g., a 10 Gigabit Ethernet connection), Fibre Channel over Ethernet (FCoE) connections, one or more asynchronous transfer mode (ATM) connections, one or more Internet connections, and/or the like.

As discussed above and further emphasized here, FIG. 1 is merely an example which should not unduly limit the scope of the claims. One of ordinary skill in the art would recognize many variations, alternatives, and modifications. According to some embodiments, CPU 110 and compactor 130 may be coupled together using mechanisms other than bus 120. In some examples, CPU 110 and compactor 130 may be coupled over a network, such as by using a network connection similar to network connection 140.

Figure 2:
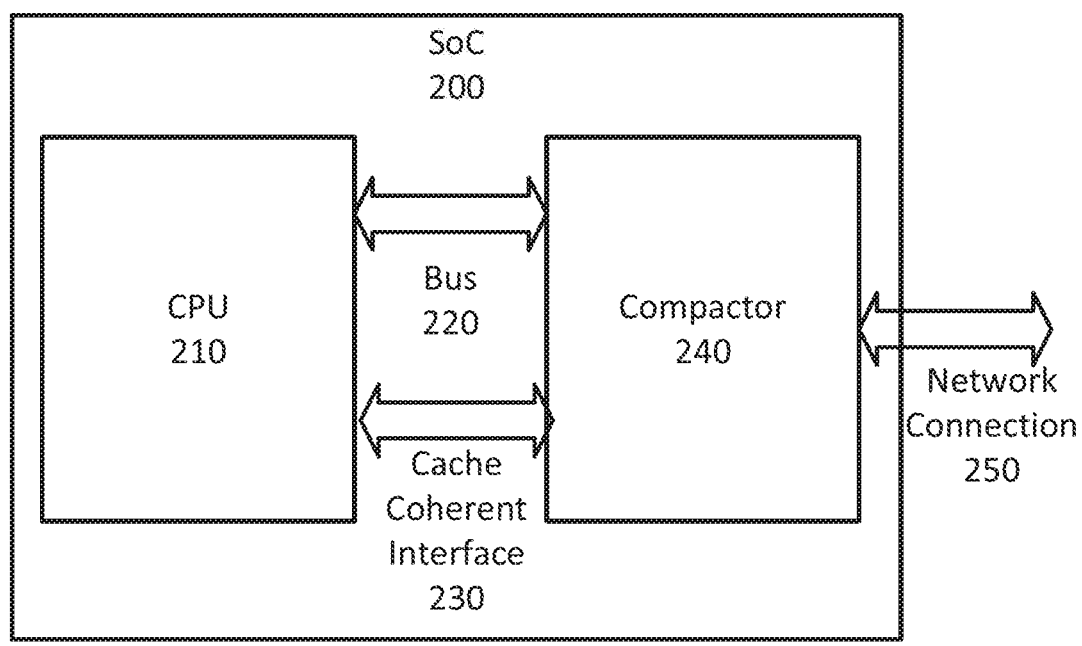

FIG. 2 is a simplified diagram of a compaction architecture based around a system on a chip (SoC) 200 according to some embodiments. Similar to architecture 100, SoC 200 includes a CPU 210 coupled via a bus 220 to a compactor 240, which are consistent with CPU 110, bus 120, and compactor 130, respectively. Additionally, compactor 240 is coupled to one or more network connections 250, which are consistent with the one or more network connections 140 of architecture 100. In contrast to architecture 100, CPU 210 and compactor 240 are further coupled using a cache coherent interface 230. An advantage of the architecture of SoC 200 over architecture 100 is that compactor 240 has access to the cache memory of CPU 210 via the high-speed interconnect of cache coherent interface 230.

According to some embodiments, the type and amount of data that is moved from the memory of CPUs 110 and/or 210 to the memory of compactors 130 and/or 240 is relevant to the choice of whether to use architecture 100 and/or SoC 200 for a particular compactor. In the examples of FIG. 1, the data movement is important for architecture 100 to be effective. In the examples of FIG. 2, there is no movement of data between the memory of CPU 210 and the memory of compactor 240 because the memory of CPU 210 is accessible to compactor 240 via cache coherent interface 230, thus resulting in much lower data communication overhead.

According to some embodiments, the kind of data per column family that is moved from CPU memory to the FPGA memory (or accessed in the CPU memory via cache coherence) may include the SSTables of Cassandra. In general, a Cassandra SSTable is similar to a key-value pair representation. However, because Cassandra is a NoSQL Database that uses the columnar data format, the values are stored as a column family where there may be many columns for each key. In addition, each column may have its own time-to-live (TTL) and timestamp. In some examples and depending on the size of memtable, these column families may vary greatly in size. In some examples, there are various strategies to keep memtable sizes restricted to a preset size (e.g., 20 MBytes per memtable).

Figure 3:
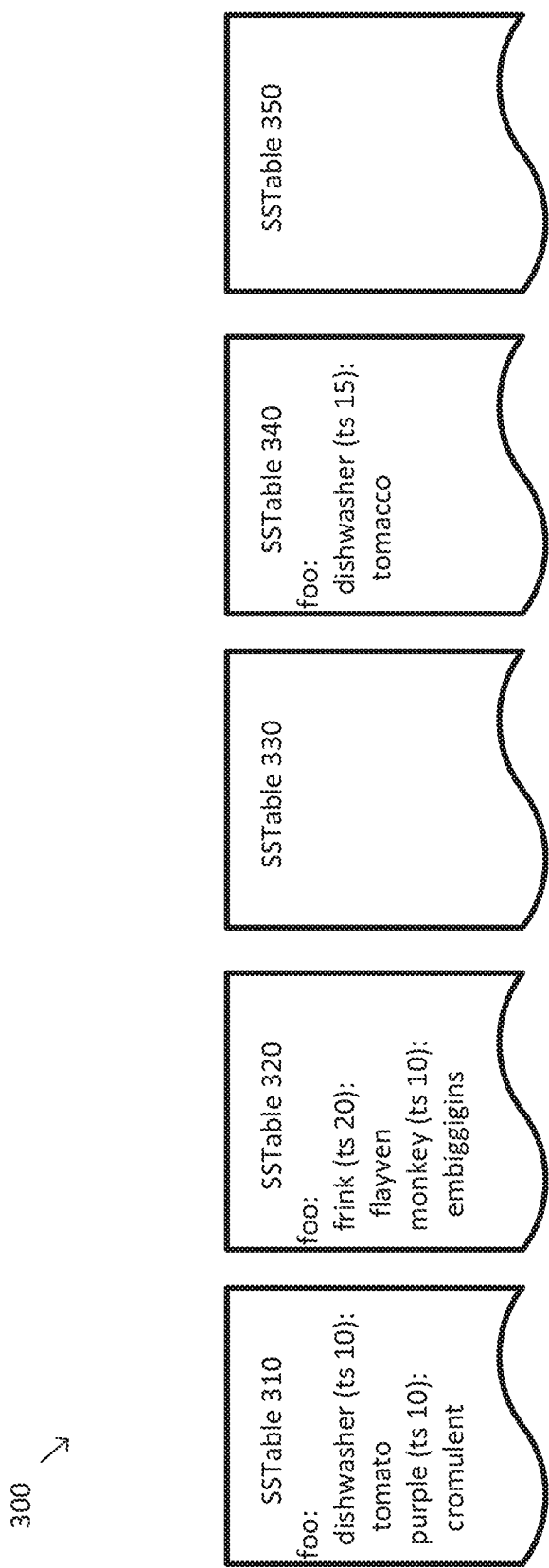
FIG. 3 is a simplified diagram of an example table according to some embodiments.

FIG. 3 is a simplified diagram of an example table 300 according to some embodiments. As shown in FIG. 3, table 300 includes several versions SSTable 310 through SSTable 350 accumulated over time as data is written to the database storing table 300. SSTable 310 includes data for dishwasher (with timestamp 10), tomato, purple (with timestamp 10), and cromulent. SSTable 2 320 includes data frink (with timestamp 20), flayven, monkey (with timestamp 10), and embiggins. SSTable 340 includes data dishwasher (with timestamp 15) and tomacco. Table 300 demonstrates some of the improvements obtained by using compaction. For example, the data dishwasher with timestamp 15 in SSTable 340 is a more recent version of data dishwasher than is included in SSTable 310, which has an earlier timestamp of 10. Thus, the earlier version of data dishwasher in SSTable 310 may be discarded (e.g., compacted out of table 300).

In some embodiments, when data is compacted out of a database table (e.g., data dishwasher in table 300), it may be helpful to remove that compacted data using a two-step process to ensure that data synchronization is maintained between different replications of the database tables across different storage nodes, which may have duplicate copies of some of the database table versions, processing being handled by different compaction engines, and/or the like. In some examples, tombstones are used to address this. In some examples, before data is removed and/or discarded, its removal is recorded using a tombstone that indicates that the data is to be removed from all replications and/or compaction engines even though a local compactor and/or compaction engine may not know that it has been superseded and/or deleted. Once the tombstone has served its purpose, it may be removed and the corresponding storage freed up for additional data.

According to some embodiments, the use of hardware-based cores for compactors 130 and/or 240 may provide numerous advantages over software-based compaction solutions. In some examples, the database to be compacted may store various types of date and/or time information (e.g., timestamps, TTL values, and/or the like). In some examples, date and/or time information is stored in a format where year, month, day, hour, minute, and/or second information is separately represented so as to avoid the need for complex and/or time consuming date and time conversion functions, millennial roll-over concerns, and/or the like. As an example, a date-time value may be stored in the format "% Y-% m-% d % H:% M", which also supports ease of presenting the dates and/or times to human users. In some examples, date-time information in this format may be stored using 13 bits for the year, 4 bits for the month, 5 bits for the days, 5 bits for the hours, and 8 bits for the minute. However, software-based date and time comparators would include 5 separate cascaded comparisons to determine whether one date-time value is larger or smaller than another. In contrast, a hardware-based solution may utilize a single 35 bit comparator that can make the same larger or smaller determination using a single comparator cycle.

In some examples, hardware-based solutions may also provide faster access than software-based approaches to the TTL, timestamp, and/or column data information from a database row. As an example, a row from a database table, such as an SSTable, may be stored in hardware registers of custom width rather than the standard register widths as would be used in CPU executing software. In some examples, this allows barrel shifters to be used to easily extract the TTL, timestamp, and/or column data information from the database row without having to use much more complex and time-consuming software to identify and index into the desired column of information. Thus, by using the custom-width register, any column of data may be accessed in a single cycle.

Figure 4:
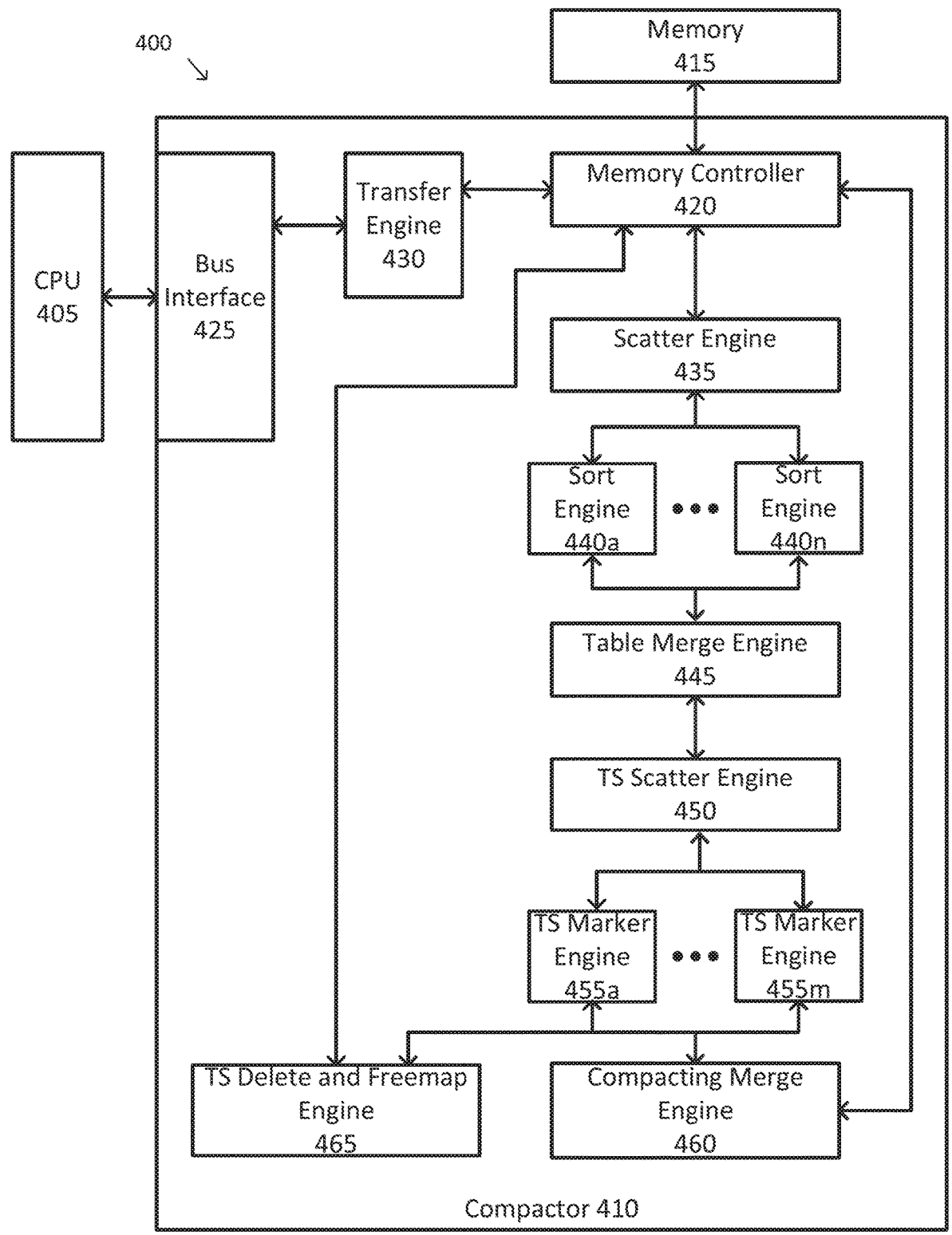
FIGS. 4 and 5 are simplified diagrams of compaction systems according to some embodiments.

FIG. 4 is a simplified diagram of a compaction system 400 according to some embodiments. As shown in FIG. 4, compaction system 400 includes a CPU 405 coupled to a compactor 410 via, for example, a bus and/or a cache coherent interface. In some embodiments, CPU 405 is consistent with CPU 110 and/or CPU 210. In some embodiments, compactor 410 is consistent with compactor 130 and/or compactor 240 and may be implemented using one or more FPGAs, ASICs, GPUs, and/or the like. Compactor 410 is further coupled to its own local compactor memory 415. In some examples, memory 415 may include static RAM (SRAM), dynamic RAM (DRAM), synchronous DRAM (SDRAM), and/or the like, which may be used for the storage of data (e.g., data from database tables) being managed by CPU 405, interim computing results, and/or the like. Compactor 410 includes a memory controller 420, such as a DRAM controller, for reading and/or writing data to and/or from memory 415, queuing memory access commands, buffering data, caching data, and/or the like.

Compactor 410 further includes a bus interface 425 and a transfer engine 430. Bus interface 425 is used by compactor 410 to communicate with CPU 405, such as for accessing data stored in a database maintained by CPU 405 and/or providing compacted data to be stored in the database. In some examples, the database is stored by CPU 405 in one or more hard disks, RAID arrays, solid-state drives, cloud storage systems (e.g., network-attached storage (NAS), storage area networks (SANs), and/or the like), and/or the like. In some examples, bus interface 425 may be a PCIe bus interface and/or the like.

Transfer engine 430 manages the transferring of the data between CPU 405 and compactor 410. Transfer engine 430 is further coupled to memory 415 through memory controller 420 and sends memory access commands to memory controller 420 as appropriate. In some examples, transfer engine 430 may be a direct memory access (DMA) controller.

Once data (e.g., a plurality of SSTables) is retrieved from the database and placed in compactor memory 415, compaction can begin. Compaction begins with a scatter engine 435. In some examples, scatter engine 435 may determine that compaction may begin by polling one or more status (e.g., data transfer complete) flags provided by transfer engine 430. Scatter engine 435 reads the data (e.g., one or more SSTables consistent with table 300) from memory 415 using memory controller 420. Scatter engine 435 then determines how many concurrent sort engines (e.g., sort engines 440a-440n) are to be used. In some examples, scatter engine 435 may determine the number of sort engines 440a-440n to be used based on the size of the table to be compacted, a number of versions of the table to be compacted, and/or the like. Scatter engine 435 then divides up the tables and versions and sends them to a corresponding number of sort engines 440a-440n so that the sorting of the entries by timestamp may be handled in parallel.

Each sort engine 440a-440n takes one or portions and/or one or more versions of a given table and sorts each of the entries based on the timestamp of entry as recorded in the corresponding row. Each sort engine 440a-440n then determines the most recent value for each entry based on the sorting. Once the sorting is complete, each sort engine 440a-440n sends its sorted portion of the table to a table merge engine 445.

Table merge engine 445 then performs additional sorting, if required, and then merges the partially sorted portions provided by sort engines 440a-440n to obtain a complete sorting, based on the timestamps, for each of the entries in the table being compacted.

The sorted table is then sent to a tombstone scatter engine 450. Similar to scatter engine 435, tombstone scatter engine 450 determines how many concurrent tombstone marker engines (e.g., tombstone marker engines 455a-455m) are to be used. In some examples, tombstone scatter engine 450 may determine the number of tombstone marker engines 455a-455m to be used based on the size of the table to be compacted, a number of versions of the table to be compacted, and/or the like. Tombstone scatter engine 450 then divides up the tables and versions and sends them to a corresponding number of tombstone marker engines 455a-455m so that tombstone marking may be handled in parallel.

Each tombstone marker engine 455a-455m identifies row-key entries with a latest timestamp (e.g., most recent) and starts marking all other entries (e.g., entries with older timestamps) for the same data with tombstones. The entries with the latest timestamp are passed to a compacting merge engine 460 and the entries with the older timestamps (e.g., the entries with tombstones) are passed to a tombstone delete and freemap engine 465.

Compacting merge engine 460 takes each of the entries with the latest timestamps and creates a compacted table that is then written back to memory 415 using memory controller 420. Once the compacted table is in memory 415, transfer engine 430 is notified to begin transferring the compacted table back to the database via bus interface 425 and CPU 405.

Tombstone delete and freemap engine 465 takes each of the tombstones corresponding to the entries with the older timestamps, collects them together, and deletes the tombstones and thus, in effect, deleting the entries with the older timestamps. Once deleted, the storage corresponding to each of the entries with the older timestamps is added to the freemap for the persistent storage, which is stored in memory 415 using memory controller 420. Once the freemap is in memory 415, transfer engine 430 is notified to begin transferring the freemap to the database via bus interface 425 and CPU 405 so that the entries freed by the compaction may be used to store new entries within the database.

As discussed above and further emphasized here, FIG. 4 is merely an example which should not unduly limit the scope of the claims. One of ordinary skill in the art would recognize many variations, alternatives, and modifications. According to some embodiments, compactor 410 may further include a control unit and/or a processor core for coordinating, synchronizing, and/or facilitating the activities of transfer engine 430, memory controller 420, scatter engine 435, sort engines 440a-440n, table merge engine 445, tombstone scatter engine 450, tombstone marker engines 455a-455m, compacting merge engine 460, and/or tombstone delete and freemap engine 465. In some examples, the control unit and/or processor core may be partially programmable using a language like C, a scripting language, and/or the like to provide more flexibility in, for example, how scatter engine 435 and/or tombstone scatter engine 450 decide how to determine the number of and/or assign portions of tables to sort engines 440a-440n and/or tombstone marker engines 455a-455m, respectively.

Figure 5:
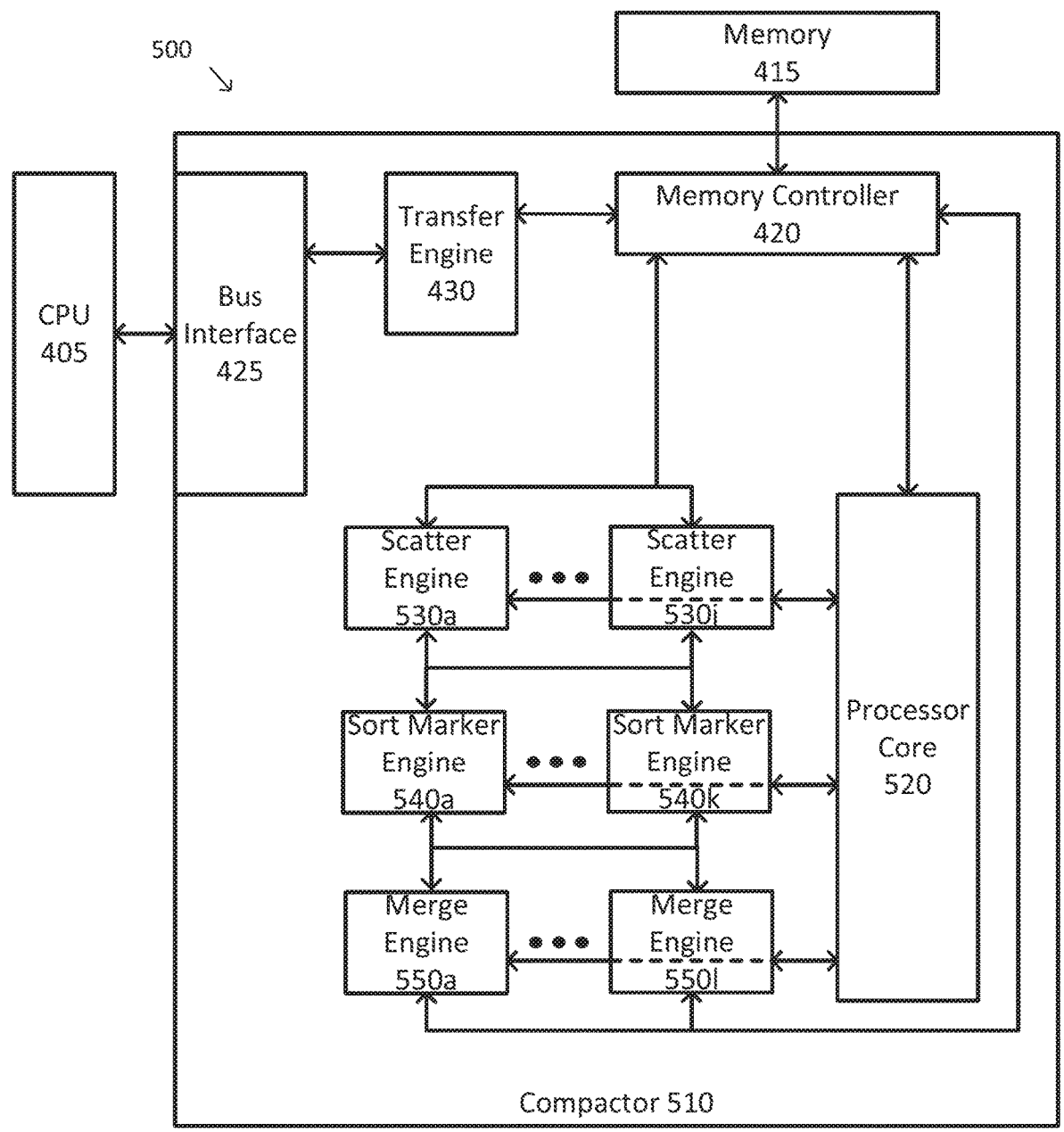

FIG. 5 is a simplified diagram of a compaction system 500 according to some embodiments. As shown in FIG. 5, compaction system 500 includes CPU 405 (e.g., substantially the same CPU 405 as included in compaction system 400) coupled to a compactor 510 via, for example, a bus and/or a cache coherent interface. In some embodiments, compactor 510 is consistent with compactor 130 and/or compactor 240 and may be implemented using one or more FPGAs, ASICs, GPUs, and/or the like. Compactor 510 is further coupled to its own compactor memory 415 preforming substantially the same role as memory 415 from compaction system 400. Compactor 510 includes a memory controller 420, a bus interface 425, and a transfer engine 430 performing substantially the same roles as the similarly numbered counterparts in compaction system 400.

According to some embodiments, compactor 510 is a more generalized implementation of a compactor using a more programmable and/or flexible architecture than compactor 410. Compactor 510 uses a processor core 520 that implements compaction around three types of processing blocks: scatter engines 530a-530j, sort marker engines (SMEs) 540a-540k, and merge engines 550a-550l. In some examples, processor core 520 is a small footprint control unit that coordinates, synchronizes, and/or facilitates the activities of scatter engines 530a-530j, sort marker engines 540a-540k, and merge engines 550a-550l. In some examples, processor core 520 may be partially programmable using a language like C, a scripting language, and/or the like to provide more flexibility in, for example, how the number of and/or the assignment of portions of the table to scatter engines 530a-530j, sort marker engines 540a-540k, and/or merge engines 550a-550l occurs. In some examples, processor core 520 is responsive to one or more attributes that may be selected by a user, a database, and/or another system.

Each scatter engine 530a-530j includes one or more registers that are used to identify corresponding identifiers for each table, version of a table, and/or a portion of a table that is to be processed by the respective scatter engine 530a-530j. In some examples, each scatter engine 530a-530j further includes other table and/or entry specific information such as a size, a timestamp, a TTL, and/or the like. In some embodiments, each scatter engine 530a-530j is responsible for dividing the table and entries using an approach similar to that used by scatter engine 435 of FIG. 4.

Each sort marker engine (SME) implements a sorting mechanism that may be used either to sort entries to find those entries with data having a latest timestamp (e.g., similar to each of sort engines 540a-540n) and/or to mark entries with older timestamps with tombstones (e.g., similar to each of tombstone marker engines 555a-555m).

Each merge engine 550a-550l merges the sorted and tombstone marked entries to generate the compacted table (e.g., similar to compacting merge engine 460) for writing to memory 415 using memory controller 420. Each merge engine 550a-550l further collects and deletes all the tombstones and adds the corresponding persistent storage to the freemap (e.g., similar to tombstone delete and freemap engine 465) for writing to memory 415 using memory controller 420.

Once the compacted table and/or the freemap is in memory 415, transfer engine 430 is notified to begin transferring the compacted table and/or freemap back to the database via bus interface 425 and CPU 405.

As discussed above and further emphasized here, FIGS. 4 and 5 are merely examples which should not unduly limit the scope of the claims. One of ordinary skill in the art would recognize many variations, alternatives, and modifications. According to some embodiments, compactors 410 and/or 510 may have more direct access to the persistent storage used to store the database on which compaction is being performed. In some examples, transfer engine 430 may access the persistent storage without going through CPU 405 to transfer tables for compaction from the persistent storage to memory 415 and/or compacted tables and/or the freemap from memory 415 to the persistent storage.

In some embodiments, one or more of scatter engine 435, sort engines 440a-44n, table merge engine 445, tombstone scatter engine 450, tombstone marker engines 455a-455m, compacting merge engine 460, tombstone delete and freemap engine 465, scatter engines 530a-530j, sort marker engines 540a-540k, and/or merge engines 550a-550l may use one or more hardware acceleration techniques as described previously to further accelerate the compaction by compactors 410 and/or 510 relative to software-based compactors. In some examples, the one or more hardware acceleration techniques may include custom register widths, custom width comparators, barrel shifters, and/or the like.

Figure 6:
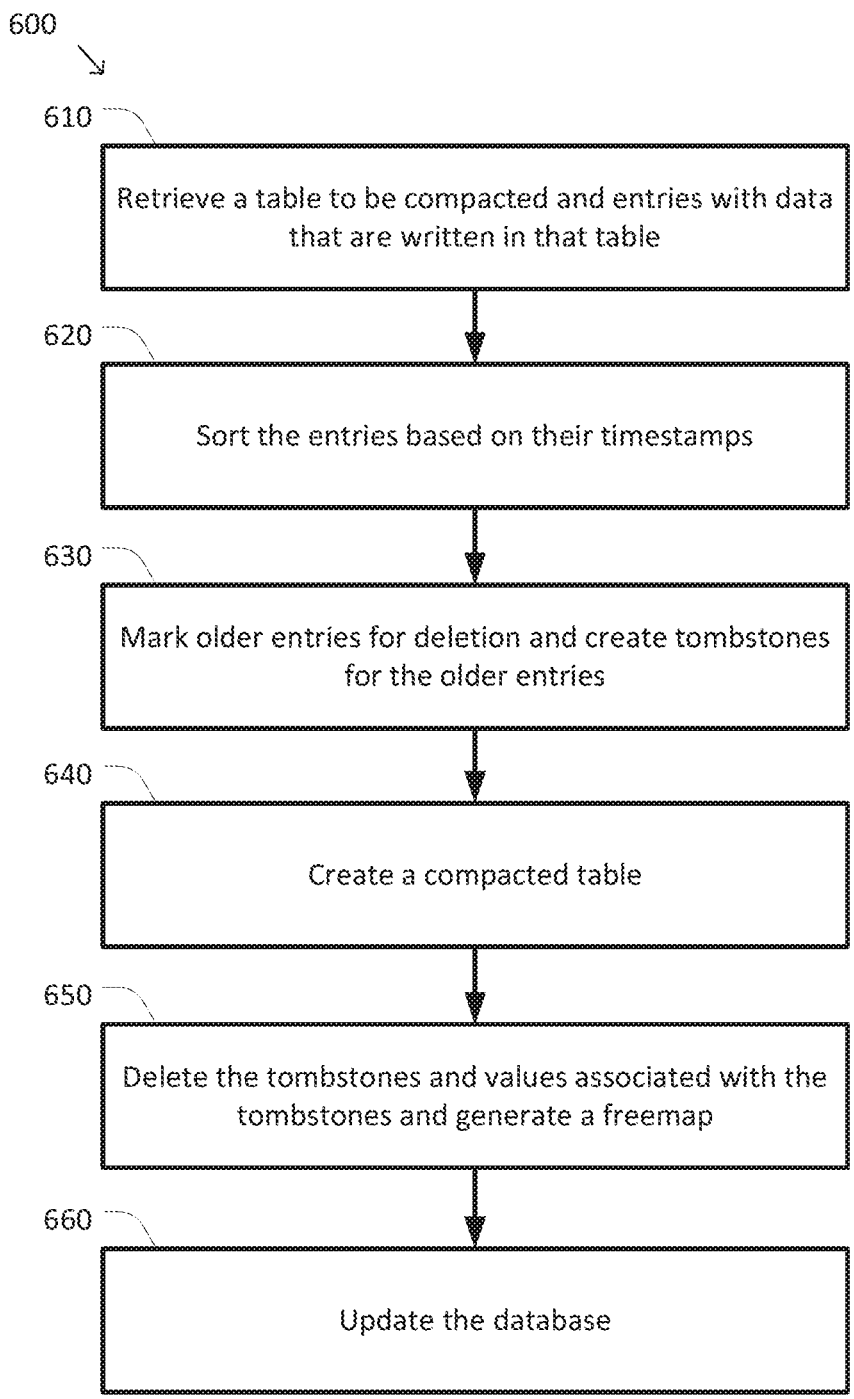
FIG. 6 is a simplified diagram of a method of compaction according to some embodiments.

FIG. 6 is a simplified diagram of a method 600 of compaction according to some embodiments. In some embodiments, one or more of the processes 610-660 of method 600 may be implemented, at least in part, in the form of executable code stored on non-transitory, tangible, machine-readable media that when run by one or more processors (e.g., CPU 110, 210, and/or 405, a processor core or control unit in compactor 130, 240, 410, and/or 520, and/or the like) may cause the one or more processors to perform one or more of the processes 610-660. In some embodiments, one or more of the processes 610-660 of method 600 may be implemented, at least in part, in the form of custom hardware and/or custom hardware and software modules in one or more FPGAs, ASICs, GPUs, and/or the like in compactor 130, 240, 410, and/or 510. In some embodiments, method 600 implements a compaction algorithm that receives un-compacted tables and entries from a database and generates compacted tables to be written back to the database.

At a process 610, a table to be compacted and entries with data that are written in that table are retrieved. In some examples, the table and entries are retrieved from a database management system running on a CPU, such as CPU 110, 210, and/or 405. In some examples, the table and entries are retrieved using a transfer engine, such as transfer engine 430, and are stored in a local memory, such as memory 415. In some examples, the table and entries are further retrieved from the local memory using a scatter engine, such as scatter engine 435 and/or scatter engines 530a-530j. In some examples, each of the values may be stored in rows with different data values being stored in different columns along with timestamps, such as is shown in the examples of FIG. 3.

At a process 620, the entries are sorted based on their timestamps. In some examples, the entries are sorted by the timestamps in order to determine which version of the data value corresponds to the most recently written value (e.g., the most up-to-date value). In some examples, the entries may be divided up into separate groups for sorting in parallel using different sort engines, such as sort engines 440a-440n and/or sort marker engines 540a-540k. In some examples, the number of sort engines to use may be determined based on the size of the table to be compacted, a number of versions of the table to be compacted, and/or the like. In some examples, one or more portions of process 620 may be performed by scatter engine 435, scatter engines 530a-530j, sort engines 440a-440n, sort marker engines 540a-540k, table merge engine 445, and/or processor core 520.

At a process 630, older entries are marked for deletion and tombstones are created for the older entries. In some examples, older entries (e.g., those whose timestamps are older than the most recent timestamps determined during process 620) are identified and tombstones are created for each of these older entries. Each of the tombstones indicates an entry that may be deleted from the compacted version of the table. In some examples, the older entries may be divided up into separate groups for marking and tombstone creation in parallel using different marker engines, such as tombstone marker engines 455a-455m and/or sort marker engines 540a-540k. In some examples, the number of marker engines to use may be determined based on the size of the table to be compacted, a number of older versions of the table to be compacted, and/or the like. In some examples, one or more portions of process 630 may be performed by tombstone scatter engine 450, tombstone marker engines 455a-455m, sort marker engines 540a-540k, and/or processor core 520.

At a process 640, a compacted table is created. The compacted table is created based on the entries with the most recent timestamps identified during process 620 and represents the most recently written values for the table. In some examples, the compacted table is written to the local memory. In some examples, generation of the compacted table may be divided up into separate groups for compaction in parallel using different merge engines, such as merge engines 550a-550l. In some examples, the number of merge engines to use may be determined based on the size of the table to be compacted, a number of entries in the compacted table, and/or the like. In some examples, one or more portions of process 640 may be performed by compacting merge engine 460, merge engines 550a-550l, and/or processor core 520.

At a process 650, the tombstones and entries associated with the tombstones are deleted and a freemap is created. The tombstones associated with the older entries and the older entries identified during process 630 are deleted. As each of the older entries is deleted, information about where it is stored in the underlying database is added to the freemap so that those storage locations may be used to write new data to the database. In some examples, one or more portions of process 650 may be performed by tombstone delete and freemap engine 465, merge engines 550a-550l, and/or processor core 520.

At a process 660, the database is updated. In some examples, the database may be updated using a two phase process. In a first phase, the compacted table created during process 640 and the freemap created during process 650 are written back to the local memory. In a second phase, a transfer engine (such as transfer engine 430) is used to move the compacted table to the database and the freemap is used to update the freemap of the database.

As discussed above and further emphasized here, FIG. 6 is merely an example which should not unduly limit the scope of the claims. One of ordinary skill in the art would recognize many variations, alternatives, and modifications. According to some embodiments, method 600 may be adapted to provide other improvements associated with the compaction of database tables. In some examples, a commit log for the database may also compacted using method 600. In some examples, the commit log resides on persistent storage and includes a copy of the write operations processed by the database and is stored to persistent storage to act as a backup in case of power and/or other failures associated with the database. In some examples, the commit log helps prevent data loss during failures. Thus, in some examples, write operations are recorded in both the database tables and within the commit log. In some examples, the tombstones deleted during process 650 and/or the freemap generated during process 650 may be used to remove entries from the commit log that correspond to the older entries.

According to some embodiments, the processes of FIG. 6 are computationally intensive; especially as the size of the tables to be compacted increases and as the traffic that is handled by the database and/or data increases, such as due to a large number of write operations. In some examples, CPU utilization during a compaction process may be as high as 60% or more and thus may have a significant detrimental effect on the performance of read operations by the CPU. Thus offloading the compaction process to a compactor (e.g., the compactors of FIGS. 1, 2, 4, and/or 5) helps in keeping read latencies low.

According to some embodiments and depending upon the size of the programmable logic and interconnect matrix of the FPGA, the size of the ASIC, and/or the GPU used to implement the compactor, the FPGA, ASIC, and/or GPU may be used to implement multiple compactors that may operate in parallel, thus increasing the performance gains possible with the compactors of FIGS. 1, 2, 4, and/or 5. In some examples, the number of parallel compactors to use may be parameterized so that an end user, database, and/or data store may be able to configure how many parallel compactors are to be in operation.

According to some embodiments, the architectures of FIGS. 1, 2, 4, and/or 5 may be adapted to provide a high performance compaction-as-a-service within a computing cloud and/or via an on-premise as-a-service architecture wherein various instances of databases and/or data stores may request compaction by one or more compaction compactors.

Some examples of the processors, compactors, and/or compactors described herein may include non-transient, tangible, machine readable media that include executable code that when run by one or more processors may cause the one or more processors to perform the processes and methods (e.g., the processes and methods of FIG. 6) described herein. Some common forms of machine readable media that may include the processes and methods are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A compaction accelerator comprising:
a compactor separate from a processor performing read and write operations for a database or a data store based on user traffic, wherein the compactor is coupled to the processor via a bus that implements a bus standard for coupling the processor and peripherals devices, wherein the compactor performs a compaction algorithm that is separate from the read and write operations for the database or the data store based on the user traffic;
wherein the compactor is configured to:
receive a table to be compacted;
receive entries written in the table by the processor, each of the entries being associated with a timestamp indicating when they were respectively written;
identify, using a plurality of sort engines operating in parallel, the entries that were written last based on the timestamps;
mark, using a plurality of marker engines operating in parallel, older copies of the entries for deletion;
create, using the plurality of marker engines, tombstones for the older copies;
create a compacted table, including the entries that were last written, to be written to persistent storage; and
delete the tombstones and the entries associated with the tombstones.

2. The compaction accelerator of claim 1, wherein the compactor comprises one or more field-programmable gate arrays (FPGA), graphics processing engines, or application specific interface chips (ASICs).

3. The compaction accelerator of claim 1, wherein each of the sort engines uses custom-width sorters to sort based on respective timestamps.

4. The compaction accelerator of claim 1, wherein the compactor is further configured to store rows of the table in custom width registers.

5. The compaction accelerator of claim 1, wherein the table comprises a plurality of stored string tables.

6. The compaction accelerator of claim 1, wherein the deleted tombstones are further used to free up a commit log space on the persistent storage.

7. The compaction accelerator of claim 1, wherein the compaction accelerator is configured to receive the table and the entries written in the table by accessing the persistent storage.

8. The compaction accelerator of claim 1, wherein the compaction accelerator is configured to receive the table and the entries written in the table from a memory local to the compaction accelerator.

9. The compaction accelerator of claim 1, wherein the bus standard comprises the Peripheral Component Interconnect Express (PCIe) standard.

10. The compaction accelerator of claim 1, wherein the compactor includes a bus interface for communicating with the processor, the bus interface comprising a Peripheral Component Interconnect Express (PCIe) bus interface.

11. A method of database compaction, the method comprising:
performing the database compaction via a compactor that is separate from a processor performing read and write operations for a database or a data store based on user traffic, wherein the compactor is coupled to the processor via a bus that implements a bus standard for coupling the processor and peripherals devices, wherein the compactor performs a compaction algorithm that is separate from the read and write operations for the database or the data store based on the user traffic, the compactor performing the steps of:

receiving a table to be compacted;

receiving entries written in the table by the processor, each of the entries being associated with a timestamp indicating when they were respectively written;

identifying, using a plurality of sort engines operating in parallel, the entries that were written last based on the timestamps;

marking, using a plurality of marker engines operating in parallel, older copies of the entries for deletion;

creating, using the plurality of marker engines, tombstones for the older copies;

creating a compacted table, including the entries that were last written, to be written to persistent storage; and deleting the tombstones and the entries associated with the tombstones.

12. The method of claim 11, further comprising sorting the entries based on respective timestamps using custom-width sorters in each of the sort engines.

13. The method of claim 11, further comprising storing rows of the table in custom width registers.

14. The method of claim 11, wherein the table comprises a plurality of stored string tables.

15. The method of claim 11, further comprising freeing up a commit log space on the persistent storage based on the deleted tombstones.

16. The method of claim 11, wherein receiving the table and the entries written in the table comprises accessing the persistent storage.

17. The method of claim 11, wherein receiving the table and the entries written in the table comprises reading them from a memory local to the compactor.

18. A system comprising:

a plurality of compaction accelerators, each of the compaction accelerators comprising a respective compactor separate from a processor performing read and write operations for a database or a data store based on user traffic, wherein the respective compactor is coupled to the processor via a bus that implements a bus standard for coupling the processor and peripherals devices, wherein the respective compactor performs a compaction algorithm that is separate from the read and write operations for the database or the data store based on the user traffic;

wherein each respective compactor is configured to:

receive a table to be compacted;

receive entries written in the table by the processor, each of the entries being associated with a timestamp indicating when they were respectively written;

identify, using a plurality of sort engines operating in parallel, the entries that were written last based on the timestamps;

mark, using a plurality of marker engines operating in parallel, older copies of the entries for deletion;

create, using the plurality of marker engines, tombstones for the older copies;

create a compacted table, including the entries that were last written, to be written to persistent storage; and delete the tombstones and the entries associated with the tombstones.

19. The system of claim 18, wherein a number of the plurality of compaction accelerators is configurable.

20. The system of claim 18, wherein a number of the plurality of compaction accelerators is configurable by a user.

21. The system of claim 18, wherein the system is available as a cloud-based service.

22. The system of claim 18, wherein the compaction accelerators operate in parallel.

* * * * *